United States Patent
Liu (10) Patent No.: US 12,446,050 B2
(45) Date of Patent: Oct. 14, 2025

(54) RESOURCE CONFIGURATION METHOD

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 372 days.

(21) Appl. No.: 18/014,159

(22) PCT Filed: Aug. 6, 2020

(86) PCT No.: PCT/CN2020/107546
§ 371 (c)(1),
(2) Date: Dec. 31, 2022

(87) PCT Pub. No.: WO2022/027496
PCT Pub. Date: Feb. 10, 2022

(65) Prior Publication Data
US 2023/0269744 A1    Aug. 24, 2023

(51) Int. Cl.
*H04W 72/23* (2023.01)
*H04W 72/51* (2023.01)

(52) U.S. Cl.
CPC ........... *H04W 72/23* (2023.01); *H04W 72/51* (2023.01)

(58) Field of Classification Search
CPC . H04W 72/23; H04W 72/51; H04W 72/0446; H04L 5/0091; H04L 5/0064
See application file for complete search history.

(56) References Cited

U.S. PATENT DOCUMENTS

| 2019/0387546 | A1* | 12/2019 | Li | H04L 27/26025 |
| 2020/0154424 | A1  | 5/2020 | Mondal et al. | |
| 2021/0360510 | A1* | 11/2021 | Zheng | H04L 5/0012 |
| 2021/0368367 | A1* | 11/2021 | Jiang | H04W 52/02 |
| 2022/0038207 | A1* | 2/2022 | Frenne | H04L 5/0053 |
| 2023/0179374 | A1* | 6/2023 | Xu | H04L 5/0053 370/329 |

FOREIGN PATENT DOCUMENTS

| CN | 110621073 A | 12/2019 |
| CN | 111525995 A | 8/2020 |
| WO | 2018128427 A1 | 7/2018 |

OTHER PUBLICATIONS

International Search Report issued in Application No. PCT/CN2020/107546, dated Apr. 26, 2021, with English translation, (4p).
Samsung, "UE complexity reduction", 3GPP TSG RAN WG1 #101,R1-2003910, e-Meeting, May 25-Jun. 5, 2020, (7p).

* cited by examiner

*Primary Examiner* — Sun Jong Kim
(74) *Attorney, Agent, or Firm* — Arch & Lake LLP (57) ABSTRACT

An information transmission method, applied to a base station is provided. The method includes: configuring, according to a receiving object of remaining minimum system information (RMSI), resources of a control resource set corresponding to the RMSI. An information transmission method, applied to user equipment (UE), is also provided. The method includes: receiving, by a user equipment (UE), a main information block (MIB); and determining, by the UE, according to a receiving object of remaining minimum system information (RMSI), resource of a control resource set corresponding to the RMSI indicated by the MIB.

20 Claims, 5 Drawing Sheets

RESOURCE CONFIGURATION METHOD

CROSS-REFERENCE TO RELATED APPLICATION

This application is the U.S. national phase application of International Patent Application No. PCT/CN2020/107546, filed on Aug. 6, 2020, the entire content of which is incorporated herein by reference for all purposes.

FIELD

The present disclosure relates to, but is not limited to, the technical field of wireless communication, and in particular to a resource configuration method, a resource configuration apparatus, a communication device, and a storage medium.

BACKGROUND

At present, the research on a project of reduced capability NR devices (REDCAP) of the version 17 (R17) standard has been carried out in 3GPP. The goal of the project is to reduce the complexity of user equipments (UEs) and save the cost under the condition of coexisting with R15/16 terminals.

A signal reception capability of the reduced capability NR devices will be affected after the capabilities of the reduced capability NR devices such as an antenna count and a bandwidth are reduced. There may be some problems in the coverage of many channels in the original standard, so there is a need to introduce coverage enhancement schemes, such as a coverage enhancement for broadcast channels.

SUMMARY

In view of this, the present disclosure provides a resource configuration method, a resource configuration apparatus, a communication device, and a storage medium.

According to a first aspect of the present disclosure, there is provided a resource configuration method, which is applied to a user equipment (UE). The method includes configuring, according to a receiving object of remaining minimum system information (RMSI), resources of a control resource set corresponding to the RMSI.

According to a second aspect of the present disclosure, there is provided an information transmission method, which is applied to user equipments (UEs). The method includes receiving a main information block (MIB); and determining, according to a receiving object of remaining minimum system information (RMSI), resource of a control resource set corresponding to the RMSI indicated by the MIB.

According to a third aspect of the embodiments of the present disclosure, there is provided a communication device apparatus, including a processor; a memory; and an executable program stored in the memory and capable of being run by the processor, in which the processor is configured to execute steps of the resource configuration method according to the first aspect or the second aspect when running the executable program.

BRIEF DESCRIPTION OF THE DRAWINGS

The accompanying drawings, which are incorporated in and constitute a part of this specification, illustrate embodiments consistent with the present disclosure and, together with the description, serve to explain the principles of the embodiments of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with some aspects of embodiments of the present disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, this information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
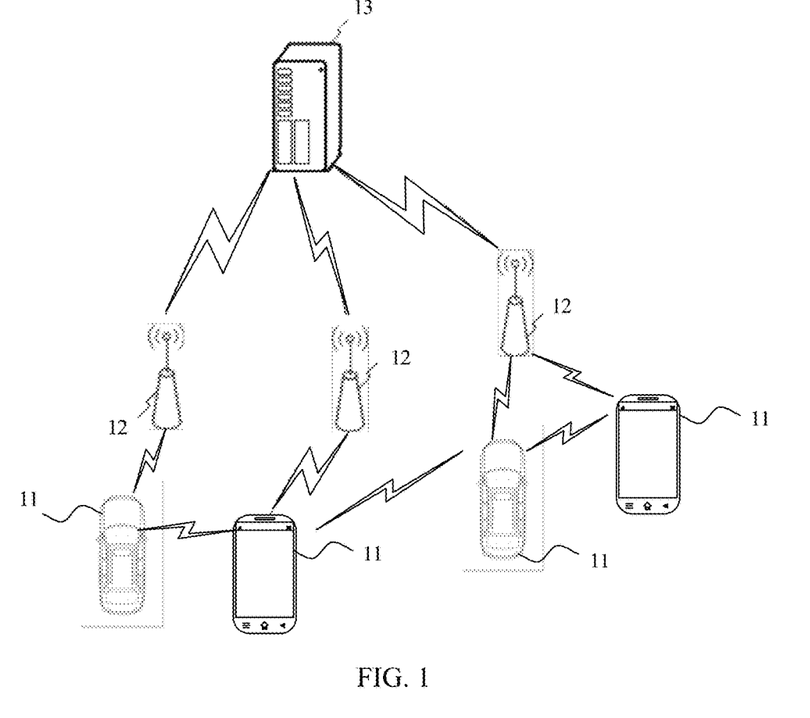
FIG. 1 is a schematic diagram showing a wireless communication system according to an illustrative embodiment.

Referring to FIG. 1, which is a schematic diagram showing a wireless communication system provided by an embodiment of the present disclosure. As shown in FIG. 1, the wireless communication system is a communication system based on a cellular mobile communication technology, and may include several terminals 11 and several base stations 12.

The terminal 11 may be a device that provides voice and/or data connectivity to a user. The terminal 11 can communicate with one or more core networks via a radio access network (RAN). The terminal 11 can be an Internet of Things terminal, such as a sensor device, a mobile phone (or referred to as a "cellular" phone) and a computer with an Internet of Things terminal. For example, it can be a fixed, portable, pocket-sized, handheld, built-in computer or vehicle-mounted apparatus. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a driving computer with a wireless communication function, or a wireless communication device externally connected with a driving computer. Alternatively, the terminal 11 may be a roadside device, such as a street lamp, a signal lamp or other roadside devices with a wireless communication function.

The base station 12 may be a network side device in the wireless communication system. The wireless communication system can be a $4^{th}$ generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system can be referred to as a new generation-radio access network (NG-RAN), or a MTC system.

The base station 12 may be an evolved base station (eNB) used in the 4G system. Alternatively, the base station 12 may be a centralized distributed architecture base station (gNB) used in the 5G system. When the base station 12 adopts the centralized distributed architecture, it usually includes a central unit (CU) and at least two distributed units (DUs). A protocol stack of a packet data convergence protocol (PDCP) layer, a radio link control (RLC) layer and a media access control (MAC) layer is provided in the central unit. A protocol stack of a physical (PHY) layer is provided in the distributed unit. The specific implementation of the base station 12 is not limited in the embodiments of the present disclosure.

A wireless connection can be established between the base station 12 and the terminal 11 through a wireless radio. In different embodiments, the wireless radio is a wireless radio based on the $4^{th}$ generation mobile communication network technology (4G) standard. Alternatively, the wireless radio is a wireless radio based on the $5^{th}$ generation mobile communication network technology (5G) standard. For example, the wireless radio is a new radio. Alternatively, the wireless radio can also be a wireless radio based on the next generation mobile communication network technology standard of the 5G.

In some embodiments, an end to end (E2E) connection may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the wireless communication system may further include a network management device 13.

Several base stations 12 are connected to the network management device 13, respectively. The network management device 13 may be a core network device in the wireless communication system, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 13 is not limited in the embodiment of the present disclosure.

Executors involved in embodiments of the present disclosed include, but are not limited to, UEs such as mobile phone terminals that support the cellular mobile communication, and base stations, etc.

An application scenario of the embodiments of the present disclosure is that a signal reception capability of the reduced capability NR devices will be affected after the capabilities of the reduced capability NR devices such as an antenna count and a bandwidth are reduced. There may be some problems in the coverage of many channels in the original standard, so there is a need to introduce coverage enhancement schemes, such as a coverage enhancement for RMSI scheduling resources.

Figure 2:
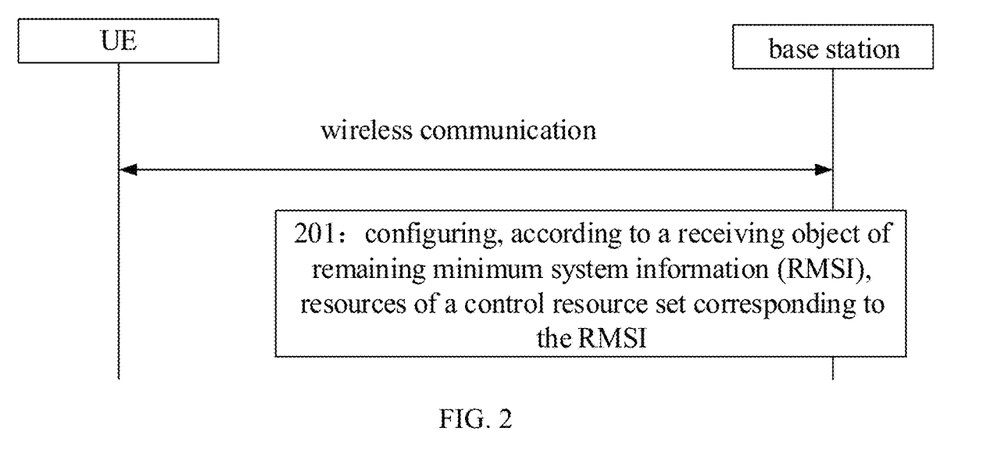
FIG. 2 is a schematic flowchart showing a resource configuration method according to an illustrative embodiment.

As shown in FIG. 2, a resource configuration method is provided in an illustrative embodiment, which can be applied to a base station of a cellular mobile communication system. The method includes step 201.

In step 201, according to a receiving object of remaining minimum system information (RMSI), resources of a control resource set corresponding to the RMSI is configured.

Here, a UE may be a mobile phone terminal or the like that uses a cellular mobile communication technology for wireless communication. The base station may be a communication device that provides an access network interface to the UE in a cellular mobile communication system.

In an embodiment, the cellular mobile communication system may be a communication system using millimeter waves as carriers.

In 5G NR, the transmission of an on-demand system information block (SIB) is supported. Necessary system information includes two parts: a main information block (MIB) and the RMSI, and the others are unnecessary information, which can be read when needed. The RMSI is essentially SIB1, which is used to indicate information such as an uplink frequency and time division multiplexing configuration.

Here, the control resource set may be a control resource set (CORESET #0). In the downlink synchronization process of the NR, the UE first blindly detects a synchronization signal and a PBCH block (SSB), then finds the corresponding CORESET #0 according to the SSB, then acquires the scheduling information of the RMSI (such as DCI information corresponding to the RMSI) from the PDCCH based on the CORESET #0, and then receives the RMSI on a physical downlink shared channel (PDSCH) resource indicated by the DCI information.

The CORESET #0 may include multiple sets of configurations, and the configurations corresponding to different indexes may be specified in a communication protocol. The UE can determine the indexes configured by the base station through the MIB, and determine the CORESET #0 by looking up a table, such as the number of consecutive RBs occupied in a frequency domain, the number of consecutive symbols occupied in a time domain, etc. The COREST corresponding to different indexes is shown in Table 1.

TABLE 1

| Index | SS/PBCH block and CORESET multiplexing pattern | Number of RBs | Number of Symbols | Offset |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 0 |
| 5 | 1 | 48 | 1 | 28 |
| 6 | 1 | 48 | 2 | 0 |
| 7 | 1 | 48 | 2 | 28 |
| 8 | 1 | 48 | 3 | 0 |
| 9 | 1 | 48 | 3 | 28 |
| 10 | Reserved | | | |
| 11 | Reserved | | | |
| 12 | Reserved | | | |
| 13 | Reserved | | | |
| 14 | Reserved | | | |
| 15 | Reserved | | | |

Here, the receiving object of the RMSI may be the UE. The base station broadcasts the scheduling information of the RMSI in the PDCCH resource configured in the CORESET #0, and the UE monitors the scheduling information of the RMSI in the PDCCH resource configured in the CORESET #0. Reception capabilities of different types of UEs are different. For example, enhanced mobile broadband (eMBB) UEs such as mobile phone terminals have a strong reception capability, while reduced capability UEs such as smart watches or Internet of Things terminals have a weak reception capability.

The scheduling information of the RMSI may be repeatedly sent for a UE with a weak reception capability to achieve the effect of accumulating the transmit power. The UE can merge and decode the repeatedly received scheduling information of the RMSI to improve the success rate of data reception.

Here, resources of different control resource sets may be configured for different receiving objects. The resources of the control resource sets corresponding to the different receiving objects can adapt to the reception capabilities of the different receiving objects. The base station can send the scheduling information of the RMSI according to the resources of the different control resource sets for the different receiving objects to satisfy the requirements of the different receiving objects for data reception.

For example, the base station may configure different CORESET #0 for the same index. Transmission resources of the scheduling information of the RMSI can be determined by querying different configuration tables after the indexes are determined for different receiving objects of the RMSI.

In some embodiments, the number of symbols in the different control resource sets may be configured for the different receiving objects. A larger number of symbols may be configured to repeatedly send the scheduling information of the RMSI for the reduced capability UE with a weak reception capability.

In this way, the resources of the control resource sets corresponding to the RMSI are configured for the receiving objects of the RMSI. On the one hand, the different resources may be configured for the different receiving objects to improve the flexibility of the resource configuration. On the other hand, the configured resources can meet the data transmission requirements of the different receiving objects, thus improving the success rate of data reception, and improving communication efficiency.

In an embodiment, the receiving object includes a first type of UE and a second type of UE; in which a bandwidth supported by the first type of UE is lower than a bandwidth supported by the second type of UE; and/or a signal reception capability of the first type of UE is lower than a signal reception capability of the second type of UE.

Different receiving objects may be UEs with different bandwidths and/or different signal reception capabilities. Here, the UEs with the different bandwidths have different data transmission capabilities, and the data transmission capabilities may include: a transmission rate, and/or a transmission delay, and/or a buffer size, and/or an ability to receive the size of a transmission block, etc. There may be two or more types of UEs. The UEs with different signal reception capabilities may have different numbers of antennas and different sensitivities for receiving wireless signals.

In some embodiments, the first type of UE and the second type of UE may be two types of various types of UEs. The first type of UE may be a reduced capability UE in a 5G cellular mobile communication system. The second type of UE may be a non-reduced capability UE in the 5G cellular mobile communication system, such as an enhanced mobile broadband (eMBB) terminal. The first type of UE supports a smaller bandwidth and has a weaker signal reception capability compared with the second type of UE.

In some embodiments, a larger number of symbols may be configured to repeatedly send the scheduling information of the RMSI, etc., for the first type of UE with a weak reception capability, thus improving the success rate of receiving the scheduling information of the RMSI by the first type of UE.

In an embodiment, the number of OFDM symbols allocated to a control resource set of the first type of UE is greater than that allocated to a control resource set of the second type of UE.

For the first type of UE with a weak reception capability, a larger number of symbols may be configured to repeatedly send the scheduling information of the RMSI, or to increase redundant information of the scheduling information of the RMSI, etc., thus improving the decoding success rate of the first type of UE. Further, the success rate of receiving the scheduling information of the RMSI by the first type of UE is improved.

Here, for resource configurations corresponding to different indexes shown in Table 1, the number of symbols corresponding to all indexes may be increased, or the number of symbols corresponding to some indexes may be increased.

In an embodiment, the number of OFDM symbols allocated to the control resource set of the first type of UE is N times the number of OFDM symbols allocated to the control resource set of the second type of UE, where N is a positive integer greater than or equal to 2.

The number of symbols which is N times the number of symbols corresponding to the second type of UE may be configured for the first type of UE with a weaker reception capability, with respect to the second type of UE. Here, a multiple N of the number of symbols corresponding to different indexes may be the same or different. It is also possible to increase the number of symbols corresponding to some indexes.

In an embodiment, values of the N corresponding to different indexes in the control resource set of the first type of UE are different.

In some embodiments, CORESET #0 of the second type of UE is shown in Table 1. CORESET #0 of the first type of UE is shown in Table 2, and the number of symbols can be increased in configurations of indexes "0", "2" and "4", compared with the configurations in Table 1. Here, k, m, and n may be positive integers greater than or equal to 2. As shown in Table 2, it is possible to increase the number of symbols corresponding to some indexes.

TABLE 2

| Index | SS/PBCH block and CORESET multiplexing pattern | Number of RBs | Number of Symbols | Offset |
|---|---|---|---|---|
| 0 | 1 | 24 | 2*k | 0 |
| 1 | 1 | 24 | 2 | 4 |
| 2 | 1 | 24 | 3*m | 0 |
| 3 | 1 | 24 | 3 | 4 |
| 4 | 1 | 48 | 1*n | 0 |
| 5 | 1 | 48 | 1 | 28 |
| 6 | 1 | 48 | 2 | 0 |
| 7 | 1 | 48 | 2 | 28 |
| 8 | 1 | 48 | 3 | 0 |
| 9 | 1 | 48 | 3 | 28 |
| 10 | Reserved | | | |
| 11 | Reserved | | | |
| 12 | Reserved | | | |
| 13 | Reserved | | | |
| 14 | Reserved | | | |
| 15 | Reserved | | | |

In this way, resources for the scheduling information of the RMSI of the first type of UE are increased, which is configured to repeatedly send the scheduling information of the RMSI, or to increase the redundant information of the scheduling information of the RMSI, etc., thus improving the decoding success rate of the first type of UE. Further, the success rate of receiving the scheduling information of the RMSI by the first type of UE is improved.

In an embodiment, a PDCCH monitoring start position allocated to the first type of UE is different from a PDCCH monitoring start position allocated to the second type of UE.

Figure 3:
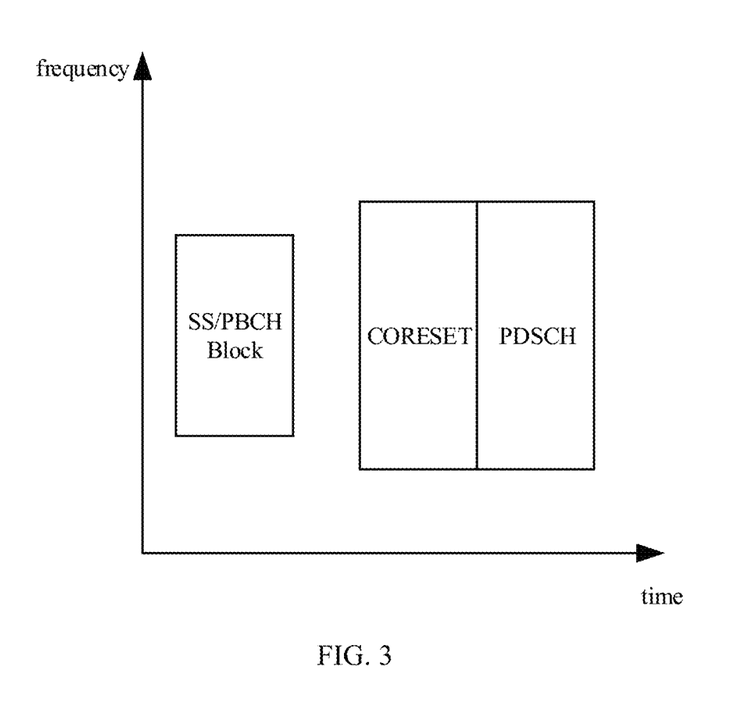
FIG. 3 is a schematic diagram showing time division multiplexing of SSB and CORESET according to an illustrative embodiment.

As shown in FIG. 3, the CORESET #0 and the SSB of the RMSI adopt the way of time division multiplexing. The base station needs to monitor the scheduling information of the RMSI on the PDCCH resource configured in the CORESET #0 after a certain number of time slots after sending the SSB.

The configuration of the PDCCH monitoring start position is shown in Table 3, and the corresponding PDCCH monitoring start position may be determined by the UE according to an index indicated in the MIB. O represents a receiving time slot.

TABLE 3

| Index | O | Number of search space sets per slot | M | First Symbol index |
|---|---|---|---|---|
| 0 | 0 | 1 | 1 | 0 |
| 1 | 0 | 2 | 1/2 | {0, if is even}, {, if is odd} |
| 2 | 2 | 1 | 1 | 0 |
| 3 | 2 | 2 | 1/2 | {0, if is even}, {, if is odd} |
| 4 | 5 | 1 | 1 | 0 |
| 5 | 5 | 2 | 1/2 | {0, if is even}, {, if is odd} |
| 6 | 7 | 1 | 1 | 0 |
| 7 | 7 | 2 | 1/2 | {0, if is even}, {, if is odd} |
| 8 | 0 | 1 | 2 | 0 |
| 9 | 5 | 1 | 2 | 0 |
| 10 | 0 | 1 | 1 | 1 |
| 11 | 0 | 1 | 2 | 2 |
| 12 | 2 | 1 | 3 | 1 |
| 13 | 2 | 1 | 4 | 2 |
| 14 | 5 | 1 | 5 | 1 |
| 15 | 5 | 1 | 6 | 2 |

For the case where a larger number of symbols are adopted by the first type of UE, a different PDCCH monitoring start position may be adopted by the first type of UE compared with the second type of UE. The case of a larger number of symbols is satisfied.

In an embodiment, a time slot number of the PDCCH monitoring start position allocated to the first type of UE is greater than or equal to 10, in response to a time slot number of the PDCCH monitoring start position allocated to the second type of UE being 0.

Here, for an index corresponding to a time slot 0 of the second type of UE at the PDCCH monitoring start position, a time slot of the first type of UE at the PDCCH monitoring start position of the index may be 10 or more.

In some embodiments, configurations of the PDCCH monitoring start position for the second type of UE is shown in Table 3, and configurations of the PDCCH monitoring start position for the first type of UE is shown in Table 4. For the second type of UE, when indexes are 0, 1, 8, 10 and 11, the scheduling information of the RMSI is monitored at the time slot 0. In Table 4, for the second type of UE, when indexes are 0, 1, 8, 10 and 11, the scheduling information of the RMSI is monitored at the time slot 10.

TABLE 4

| Index | O | Number of search space sets per slot | M | First Symbol index |
|---|---|---|---|---|
| 0 | 10 | 1 | 1 | 0 |
| 1 | 10 | 2 | 1/2 | {0, if is even}, {, if is odd} |
| 2 | 2 | 1 | 1 | 0 |
| 3 | 2 | 2 | 1/2 | {0, if is even}, {, if is odd} |
| 4 | 5 | 1 | 1 | 0 |
| 5 | 5 | 2 | 1/2 | {0, if is even}, {, if is odd} |
| 6 | 7 | 1 | 1 | 0 |
| 7 | 7 | 2 | 1/2 | {0, if is even}, {, if is odd} |
| 8 | 10 | 1 | 2 | 0 |
| 9 | 5 | 1 | 2 | 0 |
| 10 | 10 | 1 | 1 | 1 |
| 11 | 10 | 1 | 2 | 2 |
| 12 | 2 | 1 | 3 | 1 |
| 13 | 2 | 1 | 4 | 2 |
| 14 | 5 | 1 | 5 | 1 |
| 15 | 5 | 1 | 6 | 2 |

In an embodiment, in response to the number of the OFDM symbols allocated to the control resource set of the first type of UE being greater than a predetermined threshold of the number of OFDM symbols, the method further includes at least one of transmitting scheduling information of the RMSI with bandwidth resources other than an initial bandwidth part (BWP); and transmitting scheduling information of the RMSI corresponding to OFDM symbols exceeding the predetermined threshold of the number of OFDM symbols with the bandwidth resources other than the BWP.

The time domain resources for the transmission of the scheduling information of the RMSI are expanded after increasing the number of the symbols in the control resource set of the first type of UE. In the initial BWP, the transmission of the scheduling information of the RMSI and the transmission of other data may interfere with each other. Therefore, the transmission of the scheduling information of the RMSI can be performed with bandwidth resources other than the initial BWP. Here, the initial BWP may be an initial downlink bandwidth part (IDBWP).

The predetermined threshold of the number of OFDM symbols may be set based on the occupancy of bandwidth resources. Within the predetermined threshold of the number of OFDM symbols, the transmission of the scheduling information of the RMSI will not interfere with the transmission of other data.

The base station may be configured to transmit all the scheduling information of the RMSI with the bandwidth resources other than the initial BWP.

Figure 4:
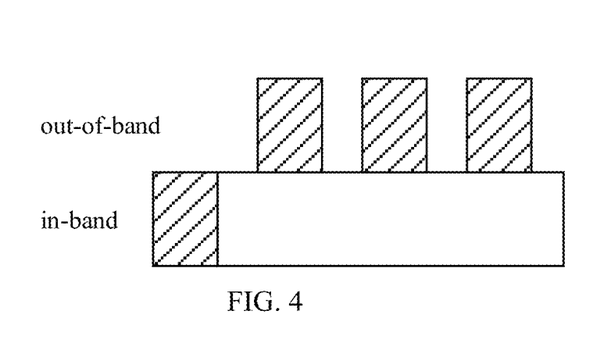
FIG. 4 is a schematic diagram showing an out-of-band transmission according to an illustrative embodiment.

As shown in FIG. 4, the base station may also be configured to transmit, with the bandwidth resources other than the initial BWP, the scheduling information of the RMSI transmitted through the OFDM symbols exceeding the predetermined threshold of the number of OFDM symbols.

The UE may receive the scheduling information of the RMSI with the initial BWP and/or the bandwidth resources other than the initial BWP configured by the base station.

In this way, it is possible to reduce the data transmission interference caused by expanding the time domain resources for the transmission of the scheduling information of the RMSI, thus improving the transmission quality.

In some embodiments, assuming that the base station is constrained to repeat within the IDBWP band, a maximum value of N is 2. Then, when the base station is configured with N=3, the IDBWP out-of-band case is indicated.

Figure 5:
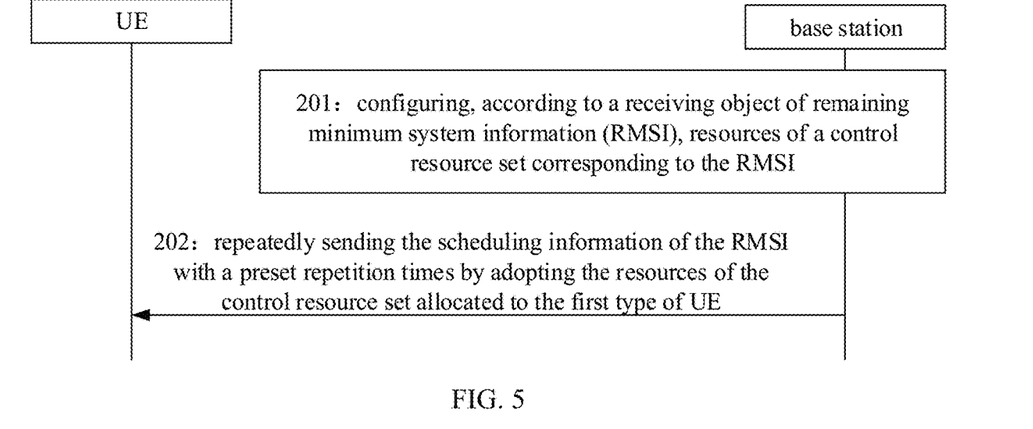
FIG. 5 is a schematic flowchart showing another resource configuration method according to an illustrative embodiment.

In an embodiment, as shown in FIG. 5, the method further includes step 202.

In step 202, the scheduling information of the RMSI is repeatedly sent according to a preset repetition times on the resources of the control resource set allocated to the first type of UE.

Different repetition times of the scheduling information of the RMSI may be configured for different numbers of symbols, so that an enhanced coverage can be achieved. The repetition times may be preset, or may be sent by the base station to the UE through a downlink signaling.

Here, the preset repetition times may be determined based on the number of increased symbols, and the number of increased symbols may be configured to repeatedly transmit the scheduling information of the RMSI. When the number of increased symbols is determined, the preset repetition times is fixed.

The preset repetition times may be a total repetition times of individual transmissions of the scheduling information of the RMSI.

The scheduling information of the RMSI may also be repeatedly transmitted when the number of symbols is not increased. The preset repetition times may indicate the repetition times of overall repeated transmissions of the scheduling information of the RMSI when the number of symbols is not increased. For example, the scheduling information of the RMSI may be repeatedly transmitted four times when the number of symbols is not increased. As shown in Table 2, when k is 2, the number of symbols is doubled, and the scheduling information of the RMSI may also be repeatedly transmitted four times for the number of increased symbols. Here, the preset repetition times may indicate the total repetition times (i.e. 8), or the repetition times (i.e. 2) of four repeated transmissions when the relative number of symbols is not increased.

Figure 6:
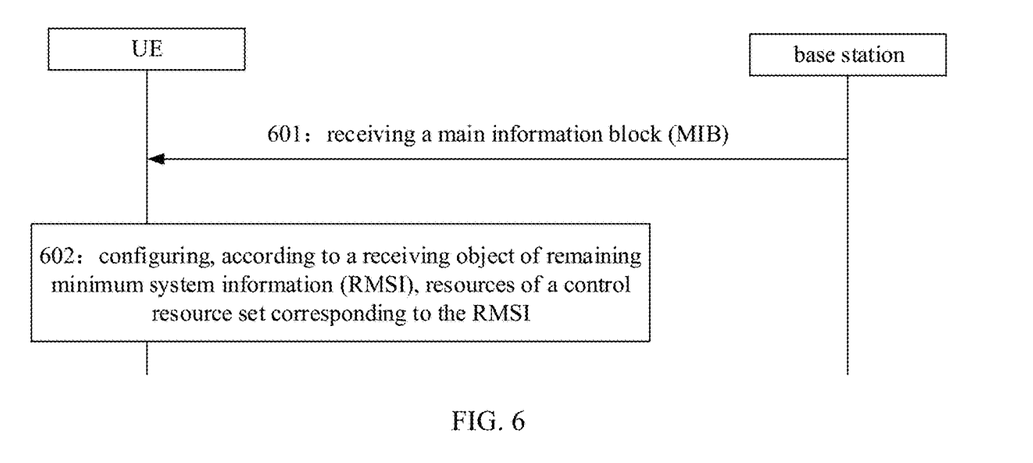
FIG. 6 is a schematic flowchart showing yet another resource configuration method according to an illustrative embodiment.

As shown in FIG. 6, a resource configuration method is provided in an illustrative embodiment, which can be applied to a UE of a cellular mobile communication system. The method includes step 601 and step 602.

In step 601, a main information block (MIB) is received.

In step 602, according to a receiving object of remaining minimum system information (RMSI), resource of a control resource set corresponding to the RMSI indicated by the MIB is determined.

Here, the UE may be a mobile phone terminal or the like that uses a cellular mobile communication technology for wireless communication. The base station may be a communication device that provides an access network interface to the UE in a cellular mobile communication system.

In an embodiment, the cellular mobile communication system may be a communication system using millimeter waves as carriers.

In 5G NR, the transmission of an on-demand system information block (SIB) is supported. Necessary system information includes two parts: a main information block (MIB) and the RMSI, and the others are unnecessary information, which can be read when needed. The RMSI is essentially SIB1, which is used to indicate information such as an uplink frequency and time division multiplexing configuration.

Here, the control resource set may be a control resource set (CORESET #0). In the downlink synchronization process of the NR, the UE first blindly detects a synchronization signal and a PBCH block (SSB), then finds the corresponding CORESET #0 according to the SSB, then acquires the scheduling information of the RMSI (such as DCI information corresponding to the RMSI) from the PDCCH based on the CORESET #0, and then receives the RMSI on a physical downlink shared channel (PDSCH) resource indicated by the DCI information.

The CORESET #0 may include multiple sets of configurations, and the configurations corresponding to different indexes may be specified in a communication protocol. The UE can determine the indexes configured by the base station through the MIB, and determine the CORESET #0 by looking up a table, such as the number of consecutive RBs occupied in a frequency domain, the number of consecutive symbols occupied in a time domain, etc. The COREST corresponding to different indexes is shown in Table 1.

Here, the receiving object of the RMSI may be the UE. The base station broadcasts the scheduling information of the RMSI in the PDCCH resource configured in the CORESET #0, and the UE monitors the scheduling information of the RMSI in the PDCCH resource configured in the CORESET #0. Reception capabilities of different types of UEs are different. For example, enhanced mobile broadband (eMBB) UEs such as mobile phone terminals have a strong reception capability, while reduced capability UEs such as smart watches or Internet of Things terminals have a weak reception capability.

The scheduling information of the RMSI may be repeatedly sent for the UE with a weak reception capability to achieve the effect of accumulating the transmit power. The UE can merge and decode the repeatedly received scheduling information of the RMSI to improve the success rate of data reception.

Here, resources of different control resource sets may be configured for different receiving objects. The resources of the control resource sets corresponding to the different receiving objects can adapt to the reception capabilities of the different receiving objects. The base station can send the scheduling information of the RMSI according to the resources of the different control resource sets for the different receiving objects to satisfy the requirements of the different receiving objects for data reception.

For example, the base station may configure different CORESET #0 for the same index. Transmission resources of the scheduling information of the RMSI can be determined by querying different configuration tables after the indexes are determined for different receiving objects of the RMSI.

In some embodiments, the number of symbols in the different control resource sets may be configured for the different receiving objects. A larger number of symbols may be configured to repeatedly send the scheduling information of the RMSI for the reduced capability UE with a weak reception capability.

In this way, the resources of the control resource sets corresponding to the RMSI are configured for the receiving objects of the RMSI. On the one hand, the different resources may be configured for the different receiving objects to improve the flexibility of the resource configuration. On the other hand, the configured resources can meet the data transmission requirements of the different receiving objects, thus improving the success rate of data reception, and improving communication efficiency.

In an embodiment, the receiving object includes a first type of UE and a second type of UE; in which a bandwidth supported by the first type of UE is lower than a bandwidth supported by the second type of UE; and/or a signal reception capability of the first type of UE is lower than a signal reception capability of the second type of UE.

Different receiving objects may be UEs with different bandwidths and/or different signal reception capabilities. Here, the UEs with the different bandwidths have different data transmission capabilities, and the data transmission capabilities may include: a transmission rate, and/or a transmission delay, and/or a buffer size, and/or an ability to receive the size of a transmission block, etc. There may be two or more types of UEs. The UEs with different signal reception capabilities may have different numbers of antennas and different sensitivities for receiving wireless signals.

In some embodiments, the first type of UE and the second type of UE may be two types of various types of UEs. The first type of UE may be a reduced capability UE in a 5G cellular mobile communication system. The second type of UE may be a non-reduced capability UE in the 5G cellular mobile communication system, such as an enhanced mobile broadband (eMBB) terminal. The first type of UE supports a smaller bandwidth and has a weaker signal reception capability compared with the second type of UE.

In some embodiments, a larger number of symbols may be configured to repeatedly send the scheduling information of the RMSI, etc., for the first type of UE with a weak reception capability, thus improving the success rate of receiving the scheduling information of the RMSI by the first type of UE.

In an embodiment, the number of OFDM symbols allocated to a control resource set of the first type of UE is greater than that allocated to a control resource set of the second type of UE.

For the first type of UE with a weak reception capability, a larger number of symbols may be configured to repeatedly send the scheduling information of the RMSI, or to increase redundant information of the scheduling information of the RMSI, etc., thus improving the decoding success rate of the first type of UE. Further, the success rate of receiving the scheduling information of the RMSI by the first type of UE is improved.

Here, for resource configurations corresponding to different indexes shown in Table 1, the number of symbols corresponding to all indexes may be increased, or the number of symbols corresponding to some indexes may be increased.

In an embodiment, the number of OFDM symbols allocated to the control resource set of the first type of UE is N times the number of OFDM symbols allocated to the control resource set of the second type of UE, where N is a positive integer greater than or equal to 2.

The number of symbols which is N times the number of symbols corresponding to the second type of UE may be configured for the first type of UE with a weaker reception capability, with respect to the second type of UE. Here, a multiple N of the number of symbols corresponding to different indexes may be the same or different. It is also possible to increase the number of symbols corresponding to some indexes.

In an embodiment, values of the N corresponding to different indexes in the control resource set of the first type of UE are different.

In some embodiments, CORESET #0 of the second type of UE is shown in Table 1. CORESET #0 of the first type of UE is shown in Table 2, and the number of symbols can be increased in configurations of indexes "0", "2" and "4", compared with the configurations in Table 1. Here, k, m, and n may be positive integers greater than or equal to 2. As shown in Table 2, it is possible to increase the number of symbols corresponding to some indexes.

In this way, resources for the scheduling information of the RMSI of the first type of UE are increased, which is configured to repeatedly send the scheduling information of the RMSI, or to increase the redundant information of the scheduling information of the RMSI, etc., thus improving the decoding success rate of the first type of UE. Further, the success rate of receiving the scheduling information of the RMSI by the first type of UE is improved.

In an embodiment, a PDCCH monitoring start position allocated to the first type of UE is different from a PDCCH monitoring start position allocated to the second type of UE.

As shown in FIG. 3, the CORESET #0 and the SSB of the RMSI adopt the way of time division multiplexing. The base station needs to monitor the scheduling information of the RMSI on the PDCCH resource configured in the CORESET #0 after a certain number of time slots after sending the SSB.

The configuration of the PDCCH monitoring start position is shown in Table 3, and the corresponding PDCCH monitoring start position may be determined by the UE according to an index indicated in the MIB. O represents a receiving time slot.

For the case where a larger number of symbols are adopted by the first type of UE, a different PDCCH monitoring start position may be adopted by the first type of UE compared with the second type of UE. The case of a larger number of symbols is satisfied.

In an embodiment, a time slot number of the PDCCH monitoring start position allocated to the first type of UE is greater than or equal to 10, in response to a time slot number of the PDCCH monitoring start position allocated to the second type of UE being 0.

Here, for an index corresponding to a time slot 0 of the second type of UE at the PDCCH monitoring start position, a time slot of the first type of UE at the PDCCH monitoring start position of the index may be 10 or more.

In some embodiments, configurations of the PDCCH monitoring start position for the second type of UE is shown in Table 3, and configurations of the PDCCH monitoring start position for the first type of UE is shown in Table 4. For the second type of UE, when indexes are 0, 1, 8, 10 and 11, the scheduling information of the RMSI is monitored at the time slot 0. In Table 4, for the second type of UE, when indexes are 0, 1, 8, 10 and 11, the scheduling information of the RMSI is monitored at the time slot 10.

In an embodiment, in response to the number of the OFDM symbols allocated to the control resource set of the first type of UE being greater than a predetermined threshold of the number of OFDM symbols, the method further includes at least one of transmitting scheduling information of the RMSI with bandwidth resources other than an initial bandwidth part (BWP); and transmitting scheduling information of the RMSI corresponding to OFDM symbols exceeding the predetermined threshold of the number of OFDM symbols with the bandwidth resources other than the BWP.

The time domain resources for the transmission of the scheduling information of the RMSI are expanded after increasing the number of the symbols in the control resource set of the first type of UE. In the initial BWP, the transmission of the scheduling information of the RMSI and the transmission of other data may interfere with each other. Therefore, the transmission of the scheduling information of the RMSI can be performed with bandwidth resources other than the initial BWP. Here, the initial BWP may be an initial downlink bandwidth part (IDBWP).

The predetermined threshold of the number of OFDM symbols may be set based on the occupancy of bandwidth resources. Within the predetermined threshold of the number of OFDM symbols, the transmission of the scheduling information of the RMSI will not interfere with the transmission of other data.

The base station may be configured to transmit all the scheduling information of the RMSI with the bandwidth resources other than the initial BWP.

As shown in FIG. 4, the base station may also be configured to transmit, with the bandwidth resources other than the initial BWP, the scheduling information of the RMSI transmitted through the OFDM symbols exceeding the predetermined threshold of the number of OFDM symbols.

The UE may receive the scheduling information of the RMSI with the initial BWP and/or the bandwidth resources other than the initial BWP configured by the base station.

In this way, it is possible to reduce the data transmission interference caused by expanding the time domain resources for the transmission of the scheduling information of the RMSI, thus improving the transmission quality.

In some embodiments, assuming that the base station is constrained to repeat within the IDBWP band, a maximum value of N is 2. Then, when the base station is configured with N=3, the IDBWP out-of-band case is indicated.

In an embodiment, the method further includes receiving the scheduling information of the RMSI that is repeatedly sent for a preset repetition times by adopting the resources of the control resource set allocated to the first type of UE in response to the UE being the first type of UE.

Different repetition times of the scheduling information of the RMSI may be configured for different numbers of symbols, so that an enhanced coverage can be achieved. The repetition times may be preset, or may be sent by the base station to the UE through a downlink signaling.

Here, the preset repetition times may be determined based on the number of increased symbols, and the number of increased symbols may be configured to repeatedly transmit the scheduling information of the RMSI. When the number of increased symbols is determined, the preset repetition times is fixed.

The preset repetition times may be a total repetition times of individual transmissions of the scheduling information of the RMSI.

The scheduling information of the RMSI may also be repeatedly transmitted when the number of symbols is not increased. The preset repetition times may indicate the repetition times of overall repeated transmissions of the scheduling information of the RMSI when the number of symbols is not increased. For example, the scheduling information of the RMSI may be repeatedly transmitted four times when the number of symbols is not increased. As shown in Table 2, when k is 2, the number of symbols is doubled, and the scheduling information of the RMSI may also be repeatedly transmitted four times for the number of increased symbols. Here, the preset repetition times may indicate the total repetition times (i.e. 8), or the repetition times (i.e. 2) of four repeated transmissions when the relative number of symbols is not increased.

A specific example is provided below in connection with any of the above-mentioned embodiments.
1. A UE that supports coverage enhancement is configured according to a new table (Table 2).
2. For the UE supporting RMSI coverage enhancement, a frequency domain table shown in Table 2 is adopted, and different repetition values, n, m, k are given for CORESET #0 with different symbol lengths.
3. For the UE supporting RMSI coverage enhancement, a time domain table shown in Table 4 is adopted, and a receiving slot is changed to 10.
4. In addition, frequency hopping (other than IDBWP) can also be realized through specific values of n, k, and m, that is, a default configuration of the UE supporting coverage enhancement is mapped with a formula as shown in FIG. 4. For example, assuming that a maximum value of n is 2 when an in-band repetition is defined, then when the base station is configured with n=3, an out-of-band case is indicated.
5. Based on item 4, the repetition times is also preconfigured.

Figure 7:
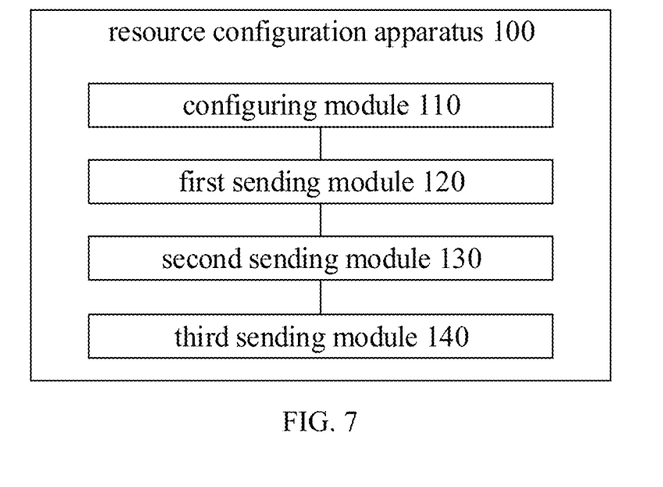
FIG. 7 is a block diagram showing a resource configuration apparatus according to an illustrative embodiment.

An embodiment of the present disclosure further provides a resource configuration apparatus, which is applied to a data frame sending end in wireless communication. As shown in FIG. 7, the resource configuration apparatus 100 includes a configuring module 110, in which the configuring module 110 is used to configure, according to a receiving object of remaining minimum system information (RMSI), resources of a control resource set corresponding to the RMSI.

In an embodiment, the receiving object includes a first type of user equipment (UE) and a second type of UE; in which a bandwidth supported by the first type of UE is lower than a bandwidth supported by the second type of UE; and/or a signal reception capability of the first type of UE is lower than a signal reception capability of the second type of UE.

In an embodiment, a number of orthogonal frequency division multiplexing (OFDM) symbols allocated to a control resource set of the first type of UE is greater than a number of orthogonal frequency division multiplexing (OFDM) symbols allocated to a control resource set of the second type of UE.

In an embodiment, the number of OFDM symbols allocated to the control resource set of the first type of UE is N times the number of OFDM symbols allocated to the control resource set of the second type of UE, where N is a positive integer greater than or equal to 2.

In an embodiment, values of the N corresponding to different indexes in the control resource set of the first type of UE are different.

In an embodiment, a physical downlink control channel (PDCCH) monitoring start position allocated to the first type of UE is different from a PDCCH monitoring start position allocated to the second type of UE.

In an embodiment, a time slot number of the PDCCH monitoring start position allocated to the first type of UE is greater than or equal to 10, in response to a time slot number of the PDCCH monitoring start position allocated to the second type of UE being 0.

In an embodiment, in response to the number of OFDM symbols of the control resource set of the first type of UE being greater than a predetermined threshold of the number of OFDM symbols, the apparatus further includes at least one of a first sending module 120 configured to transmit scheduling information of the RMSI with bandwidth resources other than an initial bandwidth part (BWP); and a second sending module 130 configured to transmit scheduling information of the RMSI corresponding to OFDM symbols exceeding the predetermined threshold of the number of OFDM symbols with the bandwidth resources other than the BWP.

In an embodiment, the apparatus 100 further includes a third sending module 140 configured to repeatedly send the scheduling information of the RMSI according to a preset repetition times on the resources of the control resource set allocated to the first type of UE.

Figure 8:
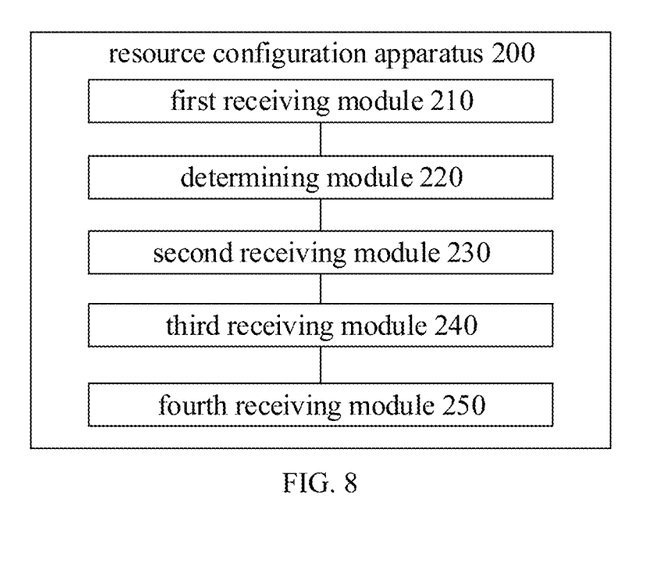
FIG. 8 is a block diagram showing another resource configuration apparatus according to an illustrative embodiment.

An embodiment of the present disclosure further provides a resource configuration apparatus, which is applied to a data frame receiving end in wireless communication. As shown in FIG. 8, the resource configuration apparatus 200 includes a first receiving module 210 and a determining module 220, in which the first receiving module 210 is configured to receive a main information block (MIB); and the determining module 220 is configured to determine, according to a receiving object of remaining minimum system information (RMSI), resources of a control resource set corresponding to the RMSI indicated by the MIB.

In an embodiment, the receiving object includes a first type of user equipment (UE) and a second type of UE; in which a bandwidth supported by the first type of UE is lower than a bandwidth supported by the second type of UE; and/or a signal reception capability of the first type of UE is lower than a signal reception capability of the second type of UE.

In an embodiment, a number of orthogonal frequency division multiplexing (OFDM) symbols allocated to the control resource set of the first type of UE is greater than a number of orthogonal frequency division multiplexing (OFDM) symbols allocated to the control resource set of the second type of UE.

In an embodiment, the number of OFDM symbols allocated to the control resource set of the first type of UE is N times the number of OFDM symbols allocated to the control resource set of the second type of UE, where N is a positive integer greater than or equal to 2.

In an embodiment, values of the N corresponding to different indexes in the control resource set of the first type of UE are different.

In an embodiment, a PDCCH monitoring start position allocated to the first type of UE is different from a PDCCH monitoring start position allocated to the second type of UE.

In an embodiment, a time slot number of the PDCCH monitoring start position allocated to the first type of UE is greater than or equal to 10, in response to a time slot number of the PDCCH monitoring start position allocated to the second type of UE being 0.

In an embodiment, in response to the number of the OFDM symbols allocated to the control resource set of the first type of UE being greater than a predetermined threshold of the number of OFDM symbols, the apparatus 200 further includes at least one of a second receiving module 230 configured to receive scheduling information of the RMSI with bandwidth resources other than an initial bandwidth part (BWP); and a third receiving module 240 configured to receive scheduling information of the RMSI corresponding to OFDM symbols exceeding the predetermined threshold of the number of OFDM symbols with the bandwidth resources other than the BWP.

In an embodiment, the apparatus 200 further includes a fourth receiving module 250 configured to receive the scheduling information of the RMSI that is repeatedly sent for a preset repetition times on the resources of the control resource set allocated to the first type of UE in response to the UE being the first type of UE.

In an illustrative embodiment, the configuring module 110, the first sending module 120, the second sending module 130, the third sending module 140, the first receiving module 210, the determining module 220, the second receiving module 230, the third receiving module 240, the fourth receiving module 250, etc. can be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements, for performing the aforementioned method.

Figure 9:
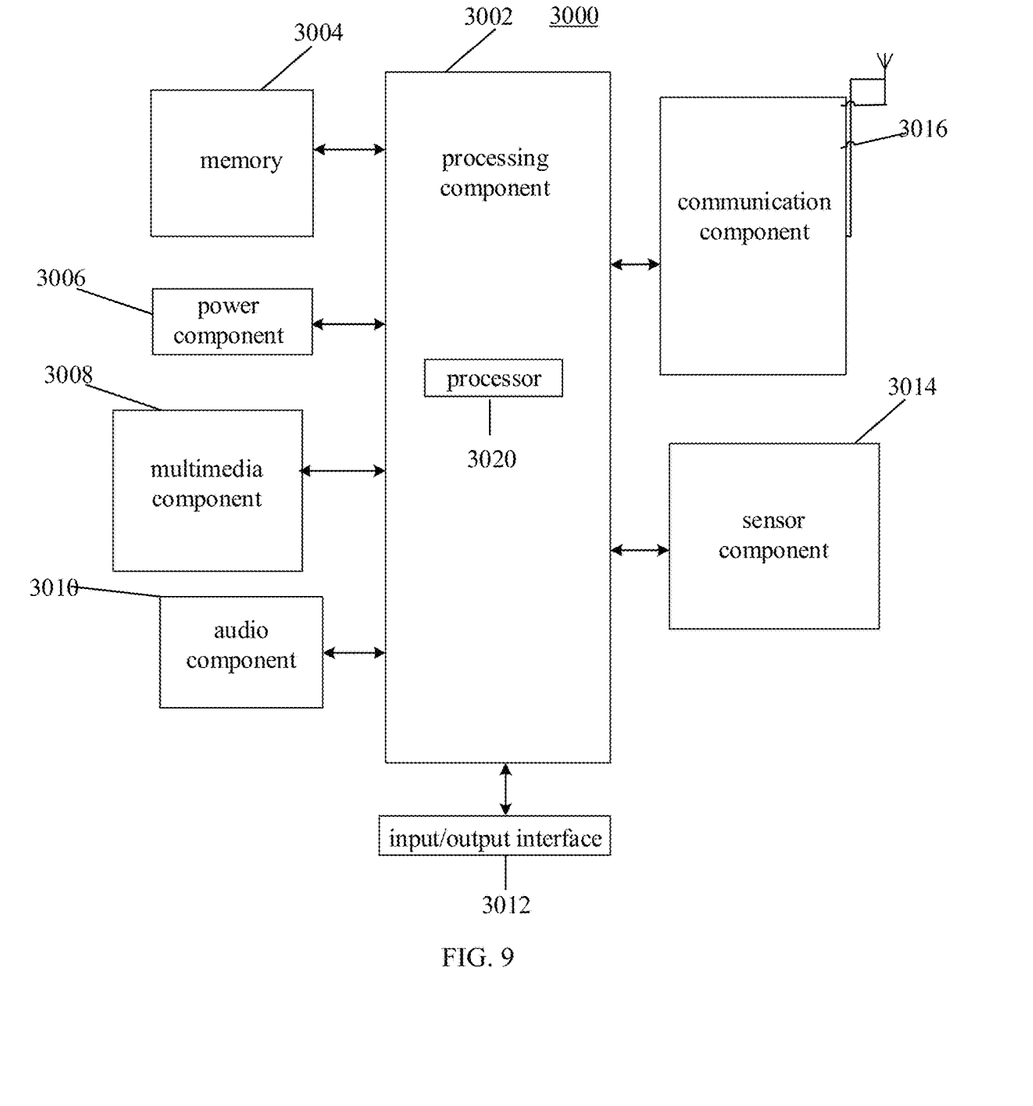
FIG. 9 is a block diagram showing an apparatus for resource configuration according to an illustrative embodiment.

FIG. 9 is a block diagram showing an apparatus 3000 for resource configuration according to an illustrative embodiment. For example, the apparatus 3000 can be a mobile phone, a computer, a digital broadcast terminal, a messaging device, a game console, a tablet device, a medical device, a fitness device, a personal digital assistant, or the like.

Referring to FIG. 9, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, phone calls, data communications, camera operations, and recording operations. The processing component 3002 can include one or more processors 3020 to execute instructions to perform all or some of the steps in the above-described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, videos, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front camera and/or a rear camera. The front camera and/or the rear camera may receive an external multimedia datum while the apparatus 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as keyboards, click wheels, buttons, and the like. The buttons may include, but are not limited to, a home button, a volume button, a starting button, and a locking button.

The sensor component 3014 includes one or more sensors to provide status assessments of various aspects of the apparatus 3000. For instance, the sensor component 3014 may detect an open/closed status of the apparatus 3000, relative positioning of components, e.g., the display and the keypad, of the apparatus 3000, a change in position of the apparatus 3000 or an component of the apparatus 3000, a presence or absence of user contact with the apparatus 3000, an orientation or an acceleration/deceleration of the apparatus 3000, and a change in temperature of the apparatus 3000. The sensor component 3014 may include a proximity sensor configured to detect the presence of nearby objects without any physical contact. The sensor component 3014 may include a light sensor, such as a CMOS or CCD image sensor, for use in imaging applications. In some embodiments, the sensor component 3014 may further include an accelerometer sensor, a gyroscope sensor, a magnetic sensor, a pressure sensor, or a temperature sensor.

The communication component 3016 is configured to facilitate communication, wired or wireless, between the apparatus 3000 and other devices. The apparatus 3000 can access a wireless network based on a communication standard, such as Wi-Fi, 2G, or 3G, or a combination thereof. In an illustrative embodiment, the communication component 3016 receives a broadcast signal or broadcast associated information from an external broadcast management system via a broadcast channel. In an illustrative embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 3004, executable by the processor 3020 in the apparatus 3000, for completing the above-mentioned network data collection method. For example, the non-transitory computer-readable storage medium may be a ROM, a random access memory (RAM), a CD-ROM, a magnetic tape, a floppy disc, an optical data storage device, and the like.

According to a first aspect of the embodiments of the present disclosure, there is provided a resource configuration method, which is applied to a user equipment (UE). The method includes configuring, according to a receiving object of remaining minimum system information (RMSI), resources of a control resource set corresponding to the RMSI.

In an embodiment, the receiving object includes a first type of user equipment (UE) and a second type of UE; in which a bandwidth supported by the first type of UE is lower than a bandwidth supported by the second type of UE; and/or, a signal reception capability of the first type of UE is lower than a signal reception capability of the second type of UE.

In an embodiment, a number of orthogonal frequency division multiplexing (OFDM) symbols allocated to a control resource set of the first type of UE is greater than a number of orthogonal frequency division multiplexing (OFDM) symbols allocated to a control resource set of the second type of UE.

In an embodiment, the number of OFDM symbols allocated to the control resource set of the first type of UE is N times the number of OFDM symbols allocated to the control resource set of the second type of UE, where N is a positive integer greater than or equal to 2.

In an embodiment, values of the N corresponding to different indexes in the control resource set of the first type of UE are different.

In an embodiment, a physical downlink control channel (PDCCH) monitoring start position allocated to the first type of UE is different from a PDCCH monitoring start position allocated to the second type of UE.

In an embodiment, a time slot number of the PDCCH monitoring start position allocated to the first type of UE is greater than or equal to 10, in response to a time slot number of the PDCCH monitoring start position allocated to the second type of UE being 0.

In an embodiment, in response to the number of the OFDM symbols allocated to the control resource set of the first type of UE being greater than a predetermined threshold of the number of OFDM symbols, the method further includes at least one of receiving scheduling information of the RMSI with bandwidth resources other than an initial bandwidth part (BWP); and receiving scheduling information of the RMSI corresponding to OFDM symbols exceeding the predetermined threshold of the number of OFDM symbols with the bandwidth resources other than the BWP.

In an embodiment, the method further includes repeatedly sending the scheduling information of the RMSI according to a preset repetition times on the resources of the control resource set allocated to the first type of UE.

According to a second aspect of the embodiments of the present disclosure, there is provided an information transmission method, which is applied to user equipments (UEs). The method includes receiving a main information block (MIB); and determining, according to a receiving object of remaining minimum system information (RMSI), resource of a control resource set corresponding to the RMSI indicated by the MIB.

In an embodiment, the receiving object includes a first type of user equipment (UE) and a second type of UE; in which a bandwidth supported by the first type of UE is lower than a bandwidth supported by the second type of UE; and/or, a signal reception capability of the first type of UE is lower than a signal reception capability of the second type of UE.

In an embodiment, a number of orthogonal frequency division multiplexing (OFDM) symbols allocated to a control resource set of the first type of UE is greater than a number of orthogonal frequency division multiplexing (OFDM) symbols allocated to a control resource set of the second type of UE.

In an embodiment, the number of OFDM symbols allocated to the control resource set of the first type of UE is N times the number of OFDM symbols allocated to the control resource set of the second type of UE, where N is a positive integer greater than or equal to 2.

In an embodiment, values of the N corresponding to different indexes in the control resource set of the first type of UE are different.

In an embodiment, a PDCCH monitoring start position allocated to the first type of UE is different from that allocated to the second type of UE.

In an embodiment, a time slot number of the PDCCH monitoring start position allocated to the first type of UE is greater than or equal to 10, in response to a time slot number of the PDCCH monitoring start position allocated to the second type of UE being 0.

In an embodiment, in response to the number of the OFDM symbols allocated to the control resource set of the first type of UE being greater than a predetermined threshold of the number of OFDM symbols, the method further includes at least one of receiving scheduling information of the RMSI with bandwidth resources other than an initial bandwidth part (BWP); and receiving scheduling information of the RMSI corresponding to OFDM symbols exceeding the predetermined threshold of the number of OFDM symbols with the bandwidth resources other than the BWP.

In an embodiment, the method further includes receiving the scheduling information of the RMSI that is repeatedly sent for a preset repetition times by adopting the resources of the control resource set allocated to the first type of UE in response to the UE being the first type of UE.

According to a third aspect of the embodiments of the present disclosure, there is provided an information transmission apparatus, which is applied to a base station. The apparatus includes a configuring module, in which the configuring module is used to configure, according to a receiving object of remaining minimum system information (RMSI), resources of a control resource set corresponding to the RMSI.

In an embodiment, the receiving object includes a first type of user equipment (UE) and a second type of UE; in which a bandwidth supported by the first type of UE is lower than a bandwidth supported by the second type of UE; and/or a signal reception capability of the first type of UE is lower than a signal reception capability of the second type of UE.

In an embodiment, a number of orthogonal frequency division multiplexing (OFDM) symbols allocated to a control resource set of the first type of UE is greater than a number of orthogonal frequency division multiplexing (OFDM) symbols allocated to a control resource set of the second type of UE.

In an embodiment, the number of OFDM symbols allocated to the control resource set of the first type of UE is N times the number of OFDM symbols allocated to the control resource set of the second type of UE, where N is a positive integer greater than or equal to 2.

In an embodiment, values of the N corresponding to different indexes in the control resource set of the first type of UE are different.

In an embodiment, a physical downlink control channel (PDCCH) monitoring start position allocated to the first type of UE is different from a PDCCH monitoring start position allocated to the second type of UE.

In an embodiment, a time slot number of the PDCCH monitoring start position allocated to the first type of UE is greater than or equal to 10, in response to a time slot number of the PDCCH monitoring start position allocated to the second type of UE being 0.

In an embodiment, in response to the number of OFDM symbols of the control resource set of the first type of UE being greater than a predetermined threshold of the number of OFDM symbols, the apparatus further includes at least one of a first sending module configured to transmit scheduling information of the RMSI with bandwidth resources other than an initial bandwidth part (BWP); and a second sending module configured to transmit scheduling information of the RMSI corresponding to OFDM symbols exceeding the predetermined threshold of the number of OFDM symbols with the bandwidth resources other than the BWP.

In an embodiment, the apparatus further includes a third sending module configured to repeatedly send the scheduling information of the RMSI according to a preset repetition times on the resources of the control resource set allocated to the first type of UE.

According to a fourth aspect of the embodiments of the present disclosure, there is provided an information transmission apparatus, which is applied to a user equipment (UE). The apparatus includes a first receiving module and a determining module, in which the first receiving module is configured to receive a main information block (MIB); and the determining module is configured to determine, according to a receiving object of remaining minimum system information (RMSI), resource of a control resource set corresponding to the RMSI indicated by the MIB.

In an embodiment, the receiving object includes a first type of user equipment (UE) and a second type of UE; in which a bandwidth supported by the first type of UE is lower than a bandwidth supported by the second type of UE; and/or a signal reception capability of the first type of UE is lower than a signal reception capability of the second type of UE.

In an embodiment, a number of orthogonal frequency division multiplexing (OFDM) symbols allocated to the control resource set of the first type of UE is greater than a number of orthogonal frequency division multiplexing (OFDM) symbols allocated to the control resource set of the second type of UE.

In an embodiment, the number of OFDM symbols allocated to the control resource set of the first type of UE is N times the number of OFDM symbols allocated to the control resource set of the second type of UE, where N is a positive integer greater than or equal to 2.

In an embodiment, values of the N corresponding to different indexes in the control resource set of the first type of UE are different.

In an embodiment, a PDCCH monitoring start position allocated to the first type of UE is different from that allocated to the second type of UE.

In an embodiment, a time slot number of the PDCCH monitoring start position allocated to the first type of UE is greater than or equal to 10, in response to a time slot number of the PDCCH monitoring start position allocated to the second type of UE being 0.

In an embodiment, in response to the number of the OFDM symbols allocated to the control resource set of the first type of UE being greater than a predetermined threshold of the number of OFDM symbols, the apparatus further includes at least one of a second receiving module configured to receive scheduling information of the RMSI with bandwidth resources other than an initial bandwidth part (BWP); and a third receiving module configured to receive scheduling information of the RMSI corresponding to OFDM symbols exceeding the predetermined threshold of the number of OFDM symbols with the bandwidth resources other than the BWP.

In an embodiment, the apparatus further includes a fourth receiving module configured to receive the scheduling information of the RMSI that is repeatedly sent for a preset repetition times on the resources of the control resource set allocated to the first type of UE in response to the UE being the first type of UE.

According to a fifth aspect of the embodiments of the present disclosure, there is provided a communication device apparatus, including a processor; a memory; and an executable program stored in the memory and capable of being run by the processor, in which the processor is configured to execute steps of the resource configuration apparatus according to the first aspect or the second aspect when running the executable program.

According to a sixth aspect of the embodiments of the present disclosure, there is provided a storage medium having stored therein executable programs that, when executed by a processor, cause steps of the resource configuration apparatus according to the first aspect or the second aspect to be implemented.

According to the resource configuration method, the resource configuration apparatus, the communication device, and the storage medium provided by the embodiments of the present disclosure, the base station configures, according to the receiving object of the remaining minimum system information (RMSI), the resources of the control resource set corresponding to the RMSI. In this way, the resources of the control resource set corresponding to the RMSI are configured for the receiving object of the RMSI. On the one hand, different resources may be configured for different receiving objects, thus improving the flexibility of resource configuration. On the other hand, the configured resources can meet the data transmission requirements of different receiving objects, thus improving the success rate of data reception, and improving communication efficiency.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

What is claimed is:

1. An information transmission method, comprising:
   configuring, by a base station, according to a receiving object of remaining minimum system information (RMSI), resources of a control resource set corresponding to the RMSI;
   wherein the receiving object comprises: a first type of user equipment (UE) and a second type of UE; wherein a bandwidth supported by the first type of UE is lower than a bandwidth supported by the second type of UE; or a signal reception capability of the first type of UE is lower than a signal reception capability of the second type of UE;
   wherein a number of orthogonal frequency division multiplexing (OFDM) symbols allocated to a control resource set of the first type of UE is greater than a number of OFDM symbols allocated to a control resource set of the second type of UE; and
   wherein in response to the number of the OFDM symbols allocated to the control resource set of the first type of UE being greater than a predetermined threshold of a number of OFDM symbols, the method further comprises at least one of:

transmitting scheduling information of the RMSI with bandwidth resources other than an initial bandwidth part (BWP); or transmitting scheduling information of the RMSI corresponding to OFDM symbols exceeding the predetermined threshold of the number of OFDM symbols with the bandwidth resources other than an initial BWP.

2. The method of claim 1, wherein the number of OFDM symbols allocated to the control resource set of the first type of UE is N times the number of OFDM symbols allocated to the control resource set of the second type of UE, where N is a positive integer greater than or equal to 2.

3. The method of claim 2, wherein values of the N corresponding to different indexes in the control resource set of the first type of UE are different.

4. The method of claim 1, wherein a physical downlink control channel (PDCCH) monitoring start position allocated to the first type of UE is different from a PDCCH monitoring start position allocated to the second type of UE.

5. The method of claim 4, wherein a time slot number of the PDCCH monitoring start position allocated to the first type of UE is greater than or equal to 10, in response to a time slot number of the PDCCH monitoring start position allocated to the second type of UE being 0.

6. The method of claim 1, further comprising:
repeatedly sending scheduling information of the RMSI according to a preset repetition times on the resources of the control resource set allocated to the first type of UE.

7. An information transmission method, comprising:
receiving, by a user equipment (UE), a main information block (MIB); and
determining, by the UE, according to a receiving object of remaining minimum system information (RMSI), resource of a control resource set corresponding to the RMSI indicated by the MIB; wherein the receiving object comprises: a first type of user equipment (UE) and a second type of UE; wherein a bandwidth supported by the first type of UE is lower than a bandwidth supported by the second type of UE; or a signal reception capability of the first type of UE is lower than a signal reception capability of the second type of UE;
wherein a number of orthogonal frequency division multiplexing (OFDM) symbols allocated to a control resource set of the first type of UE is greater than a number of OFDM symbols allocated to a control resource set of the second type of UE; and
wherein in response to the number of the OFDM symbols allocated to the control resource set of the first type of UE being greater than a predetermined threshold of a number of OFDM symbols, the method further comprises at least one of:
receiving scheduling information of the RMSI with bandwidth resources other than an initial bandwidth part (BWP); or
receiving scheduling information of the RMSI corresponding to OFDM symbols exceeding the predetermined threshold of the number of OFDM symbols with the bandwidth resources other than an initial BWP.

8. The method of claim 7, wherein the number of OFDM symbols allocated to the control resource set of the first type of UE is N times the number of OFDM symbols allocated to the control resource set of the second type of UE, where N is a positive integer greater than or equal to 2.

9. The method of claim 8, wherein values of the N corresponding to different indexes in the control resource set of the first type of UE are different.

10. The method of claim 7, wherein a PDCCH monitoring start position allocated to the first type of UE is different from a PDCCH monitoring start position allocated to the second type of UE.

11. The method of claim 10, wherein a time slot number of the PDCCH monitoring start position allocated to the first type of UE is greater than or equal to 10, in response to a time slot number of the PDCCH monitoring start position allocated to the second type of UE being 0.

12. The method of claim 7, further comprising:
receiving scheduling information of the RMSI that is repeatedly sent for a preset repetition times by adopting the resources of the control resource set allocated to the first type of UE in response to the UE being the first type of UE.

13. A communication device, comprising:
a processor;
a memory; and
an executable program stored in the memory and runnable by the processor,
wherein the processor is configured to configure, according to a receiving object of remaining minimum system information (RMSI), resources of a control resource set corresponding to the RMSI;
wherein the receiving object comprises: a first type of user equipment (UE) and a second type of UE; wherein a bandwidth supported by the first type of UE is lower than a bandwidth supported by the second type of UE; or a signal reception capability of the first type of UE is lower than a signal reception capability of the second type of UE;
wherein a number of orthogonal frequency division multiplexing (OFDM) symbols allocated to a control resource set of the first type of UE is greater than a number of OFDM symbols allocated to a control resource set of the second type of UE; and
wherein the processor is configured to: transmit scheduling information of the RMSI with bandwidth resources other than an initial bandwidth part (BWP); or transmit scheduling information of the RMSI corresponding to OFDM symbols exceeding the predetermined threshold of the number of OFDM symbols with the bandwidth resources other than an initial BWP, in a case where the number of the OFDM symbols allocated to the control resource set of the first type of UE is greater than a predetermined threshold of a number of OFDM symbols.

14. The communication device of claim 13, wherein the number of OFDM symbols allocated to the control resource set of the first type of UE is N times the number of OFDM symbols allocated to the control resource set of the second type of UE, where N is a positive integer greater than or equal to 2.

15. The communication device of claim 14, wherein values of the N corresponding to different indexes in the control resource set of the first type of UE are different.

16. The communication device of claim 13, wherein a physical downlink control channel (PDCCH) monitoring start position allocated to the first type of UE is different from a PDCCH monitoring start position allocated to the second type of UE.

17. The communication device of claim 16, wherein a time slot number of the PDCCH monitoring start position allocated to the first type of UE is greater than or equal to 10, in response to a time slot number of the PDCCH monitoring start position allocated to the second type of UE being 0.

18. A communication device, comprising:
a processor,
a memory; and
an executable program stored in the memory and runnable by the processor,
wherein the processor is configured to perform the method according to claim 7.

19. A non-transitory computer readable storage medium having stored therein executable programs that, when executed by a processor, cause the processor to perform the method according to claim 1.

20. A non-transitory computer readable storage medium having stored therein executable programs that, when executed by a processor, cause the processor to perform the method according to claim 7.

* * * * *